United States Patent
Pilolla

[11] 4,111,391
[45] Sep. 5, 1978

[54] PINCH VALVE
[75] Inventor: Joseph J. Pilolla, Elmhurst, Ill.
[73] Assignee: Sloan Valve Company, Franklin Park, Ill.
[21] Appl. No.: 743,701
[22] Filed: Nov. 22, 1976
[51] Int. Cl.² ............................................. F16K 7/07
[52] U.S. Cl. ............................................. 251/5; 285/55; 285/336
[58] Field of Search ............................................. 251/4–10, 251/61.1; 222/529

[56] References Cited
U.S. PATENT DOCUMENTS
2,212,733 8/1940 Grigsby ............................................. 251/8
3,479,002 11/1969 Hirs ............................................. 251/5
3,556,461 1/1971 Little ............................................. 251/5

FOREIGN PATENT DOCUMENTS
1,121,902 5/1956 France ............................................. 251/5
1,054,798 4/1959 Fed. Rep. of Germany ............................................. 251/5
847,055 9/1960 United Kingdom ............................................. 251/5

Primary Examiner—Martin P. Schwadron
Assistant Examiner—Richard Gerard
Attorney, Agent, or Firm—Kinzer, Plyer, Dorn & McEachran

[57] ABSTRACT

A pinch valve includes a distortable rubber-like valve member, in cylindrical form, positioned within a generally cylindrical housing. The valve member has uniformly spaced projections and grooves which enable the valve member to collapse upon itself forming a complete closure between opposite ends thereof. When the valve member so collapses, the circle defined by the outer areas thereof has a greater radius than the radius of the valve member in the uncollapsed condition. The housing has lobular areas to accommodate the extensions of the collapsed valve member.

2 Claims, 4 Drawing Figures

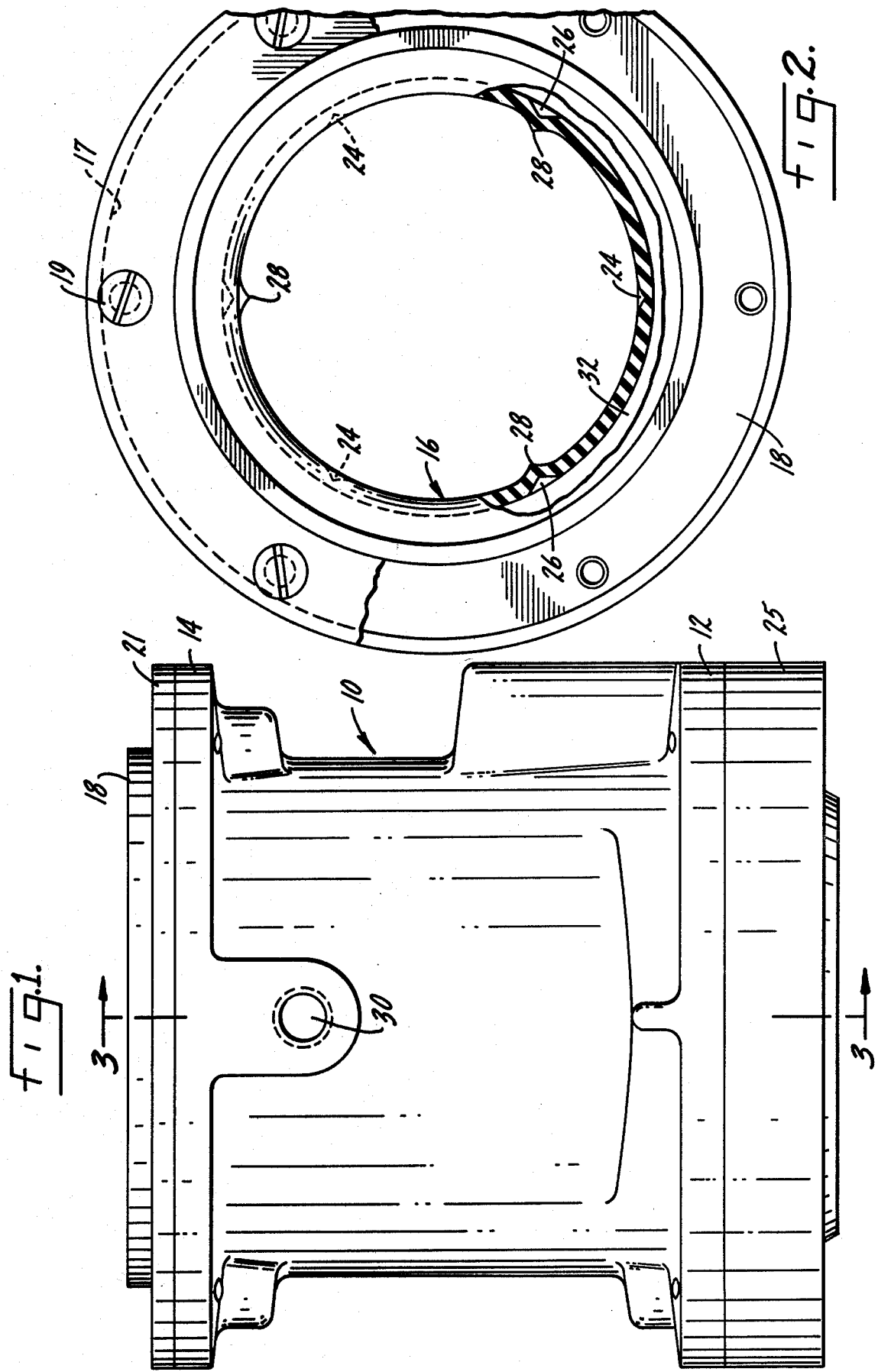

PINCH VALVE

SUMMARY OF THE INVENTION

The present invention relates to a pinch valve of the type having a generally cylindrical rubber-like distortable member positioned within a housing. Fluid pressure applied between the housing and valve member cause the collapse of the valve member upon itself, thus closing off communication between opposite ends of the valve member.

One purpose is a simply constructed reliably operable pinch valve of the type described.

Another purpose is a pinch valve of the type described in which the housing has lobular areas to accommodate the increased radius of portions of the pinch valve when it collapses upon itself.

Other purposes will appear in the ensuing specification, drawings and claims.

BRIEF DESCRIPTION OF THE DRAWINGS

The invention is illustrated diagrammatically in the following drawings wherein:

FIG. 1 is a side view of a valve of the type described,

FIG. 2 is a top plan view, in part section, of the pinch valve,

DESCRIPTION OF THE PREFERRED EMBODIMENT

The present pinch valve has use in a variety of applications. One such application is in a sewage treatment apparatus of the type shown in co-pending application Ser. No. 584,508, filed June 6, 1975 and now U.S. Pat. No. 4,013,557 in which the present applicant is a joint inventor. In a broad sense the pinch valve disclosed herein has use in any construction in which it is desired to shut off communication between opposite ends of the valve through the application of fluid pressure.

Figure 3:
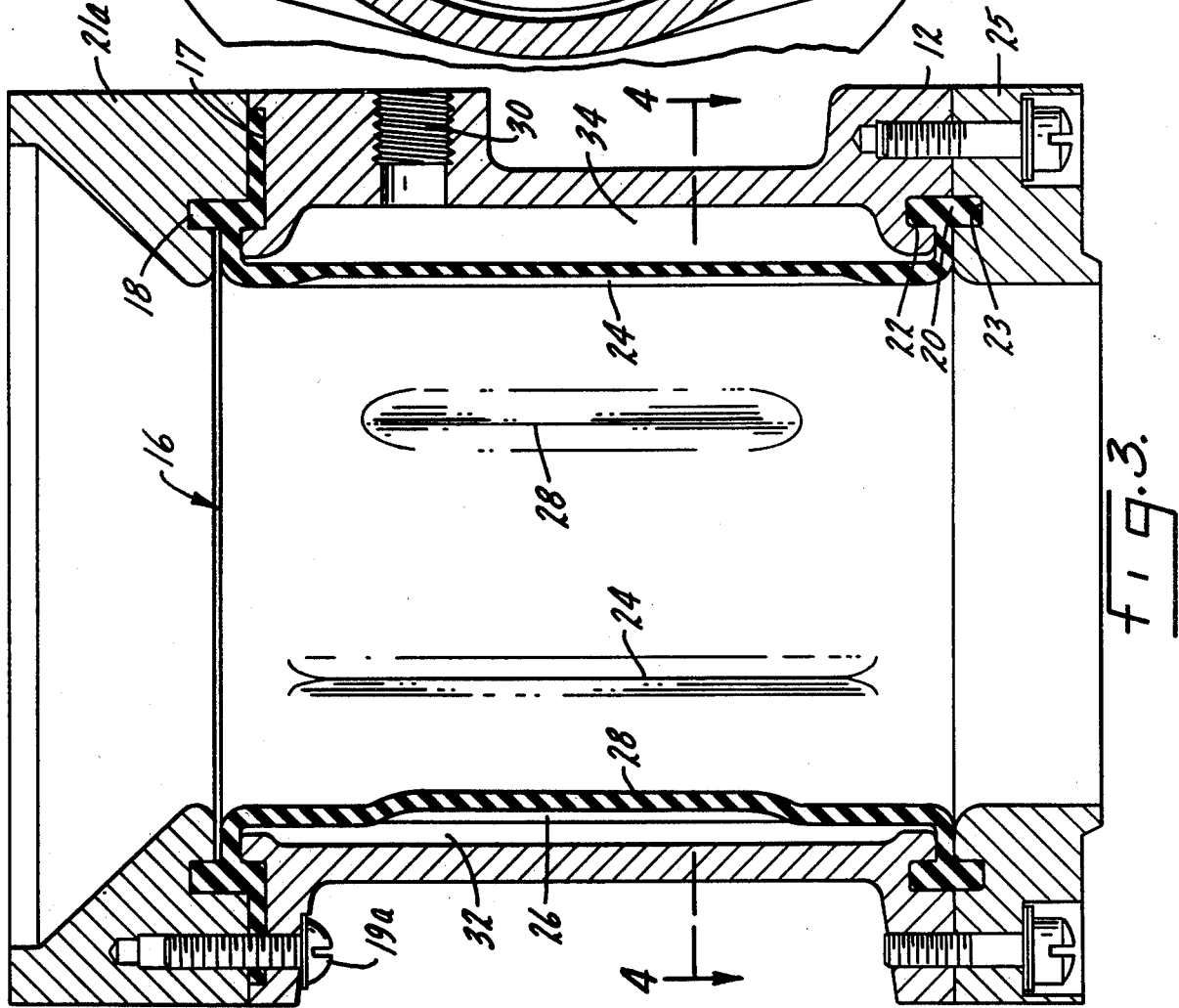
FIG. 3 is a section along plane 3—3 of FIG. 1, but with a modified top cap.

The pinch valve includes a generally cylindrical outer housing 10 having a lower flange 12 and an upper flange 14. Positioned within housing 10 is a generally cylindrical flexible distortable rubber-like valve member 16 having upper and lower flanges 18 and 20. Upper flange 18 is positioned within a peripheral groove 17 in housing flange 14 and suitable fastening means or the like 19 may extend through mating holes in a ring 21 and flanges 14 and 18 to attach the upper end of the valve member or sleeve 16 to the housing. In the modification of FIG. 3 ring 21 has been replaced by a top cap 21a held to flange 14 by screws 19a. Top cap 21a may provide a frustoconic inlet for the pinch valve.

Lower housing flange 12 has an annular axially extending groove 22 which together with a mating groove 23 in lower ring 25 receives lower sleeve flange 20 when the sleeve is assembled to the housing.

Sleeve 16 is generally cylindrical in form, as described above, and may have a plurality, preferably three, equally spaced axially extending interior grooves 24, which extend a substantial portion of the sleeve axial length, other than the upper and lower flanged areas. In like manner, there are a plurality, preferably three, exterior axially extending grooves 26 on sleeve 16, which grooves are in peripheral register with inwardly and axially extending interior projections 28. As particularly shown in FIG. 2, interior grooves 24 and the registered exterior grooves 26 and projections 28 are all equally spaced about the periphery of sleeve 16. All of the grooves and the projections extend a substantial portion of the sleeve axial length except for the flanged areas at opposite ends thereof, as particularly shown in FIG. 3.

Housing 10 includes an air pressure passage 30 which is in communication with an annular space 32 formed between the interior surface of housing 10 and the outer surface of sleeve 16. Air pressure or fluid pressure of some type, applied through passage 30 into annular space 32, will cause sleeve 16 to collapse upon itself, as described hereinafter, with the end result that the normal generally cylindrical passage between opposite ends of the sleeve is closed, thus shutting off communication through the sleeve.

Figure 4:
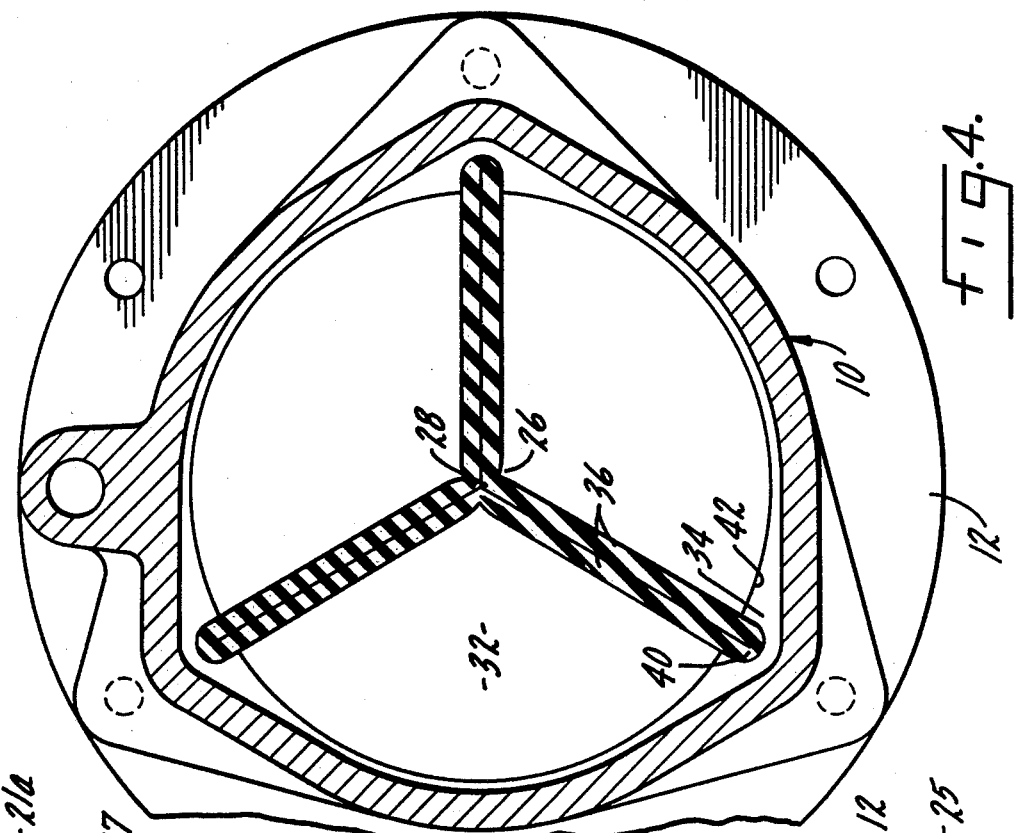
FIG. 4 is a section along plane 4—4 of FIG. 3, showing the valve in a collapsed condition.

Housing 10 has, about the interior surface thereof, a plurality, preferably three, equally spaced lobes 34 which are in register with interior grooves 24. When the sleeve collapses upon itself, as shown in FIG. 4, the circumference of the sleeve is divided by six, the number of fold walls 36 which are formed by the collapse. However, when the circumference of a circle is divided by six, the resulting number is greater than the original radius of the sleeve. Hence, lobular areas or lobes 34 are necessary to accommodate the increase in the circumference of the sleeve when in the collapsed condition.

Looking particularly at FIG. 4, when pressure is applied to annular space 32, the sleeve will collapse by folding at each of interior grooves 24. There will be six folded walls 36 each of which join an exterior fold 40 with a registered interior projection 28 and exterior groove 26. Note particularly that projections 28 will meet together at the center of the collapsed sleeve to form a generally complete closure for the sleeve. Without such mating projections it would be necessary to apply an excessively large amount of fluid pressure to cause the valve to completely close. Grooves 26 assist in the formation of walls 36 and assist in permitting projections 28 to come together at the center of the sleeve when in the collapsed condition. Folds 40 extend into lobes 34 and enlarge the actual circumference of the sleeve beyond the normal circumference 42 (FIG. 4) of the sleeve in its uncollapsed or normal condition.

Although the invention has been described specifically in connection with a sleeve having three folds, it is also possible to utilize the principle described herein with two, four or more folds. However, with two folds the extension in the sleeve radius becomes significantly great to the point where it is difficult to form a housing. With four folds, the circumference of the sleeve does not increase, but decreases.

Whereas the preferred form of the invention has been shown and described herein, it should be realized that there may be many modifications, substitutions and alterations thereto.

The embodiments of the invention in which an exclusive property or privilege is claimed are defined as follows:

1. A pinch valve including a housing, a generally cylindrical valve member formed of a flexible distortable rubber-like material attached to and positioned in said housing, said valve member having a plurality of equally spaced, axially extending grooves on the interior surface thereof, said valve member having a plurality of equally spaced axially extending projections on the interior surface thereof, a plurality of equally spaced, axially extending grooves on the exterior of said valve member in peripheral register with said projections, the exterior of said valve member in peripheral register with said interior surface grooves being continuous and unchanged relative to adjacent portions thereof, said projections on the interior surface extending for a portion of the length of said flexible valve member, said grooves on the interior surface extending for a longer portion of the length of said flexible valve member than said interior projections, the application of fluid pressure between said housing and valve member causing the inward collapse of said valve member, with the projections meeting in the center to form a generally complete closure of said valve member, and with the valve member folding upon said interior grooves, said housing having a plurality of outwardly extending lobes smoothly blending with the interior housing surface, there being the same number of lobes as there are interior grooves, the collapse of said valve member causing the outer peripheral fold surfaces to extend into said housing lobes, with the outer peripheral fold surfaces, when so collapsed, circumscribing a circle having a radius greater than that of said valve member in the uncollapsed condition.

2. The structure of claim 1 further characterized in that there are three interior grooves, three exterior grooves, and three inwardly extending projections, said inwardly extending projections and said interior grooves being generally equally spaced.

* * * * *